Nov. 4, 1941.　　　　R. P. KITE ET AL　　　2,261,390
LIME SLAKER
Filed April 24, 1940　　　2 Sheets-Sheet 1
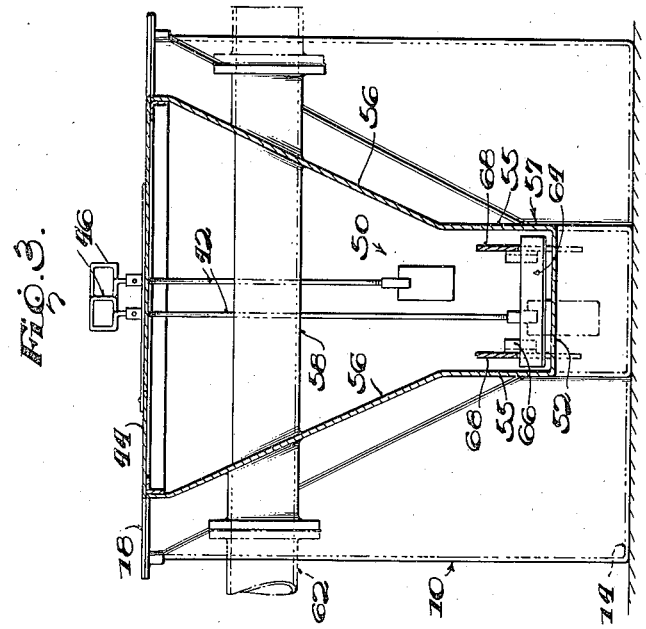
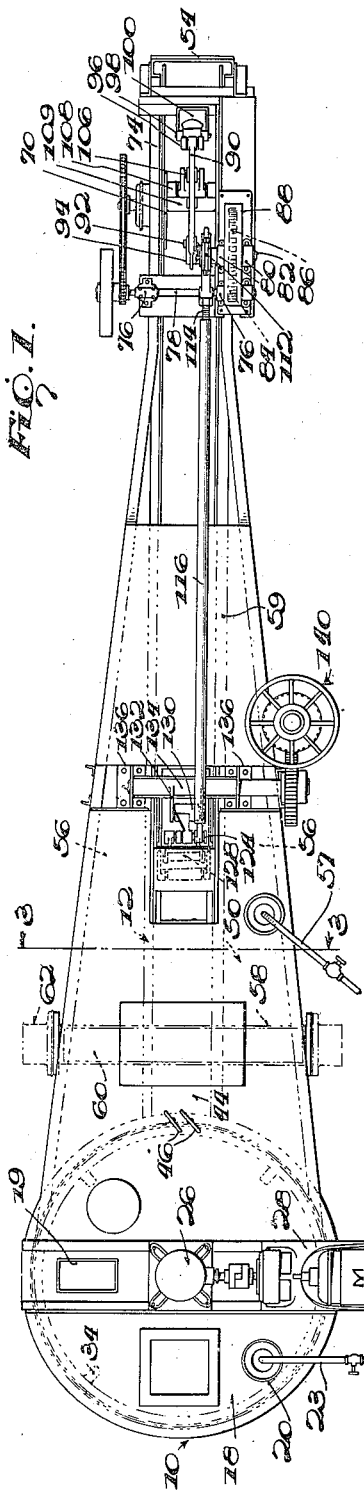
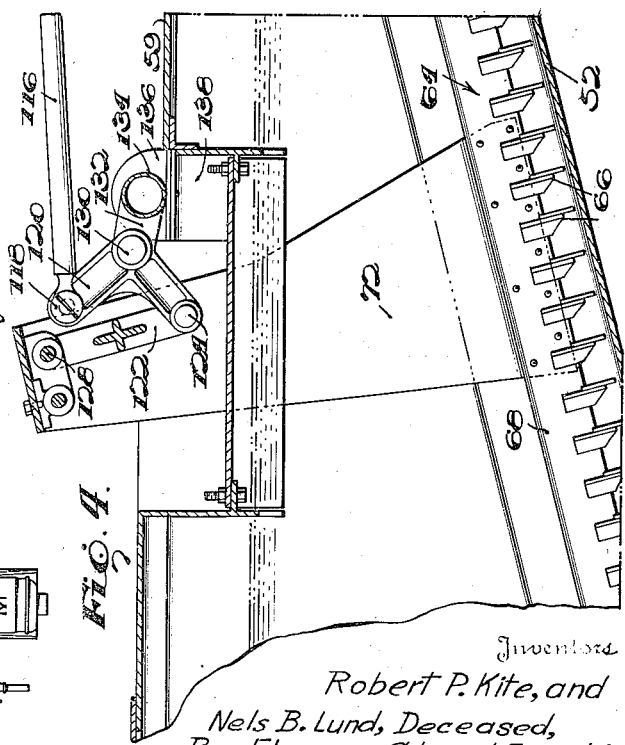
Inventors
Robert P. Kite, and
Nels B. Lund, Deceased,
By Florence C. Lund, Executrix
By Arthur Middleton  Attorney

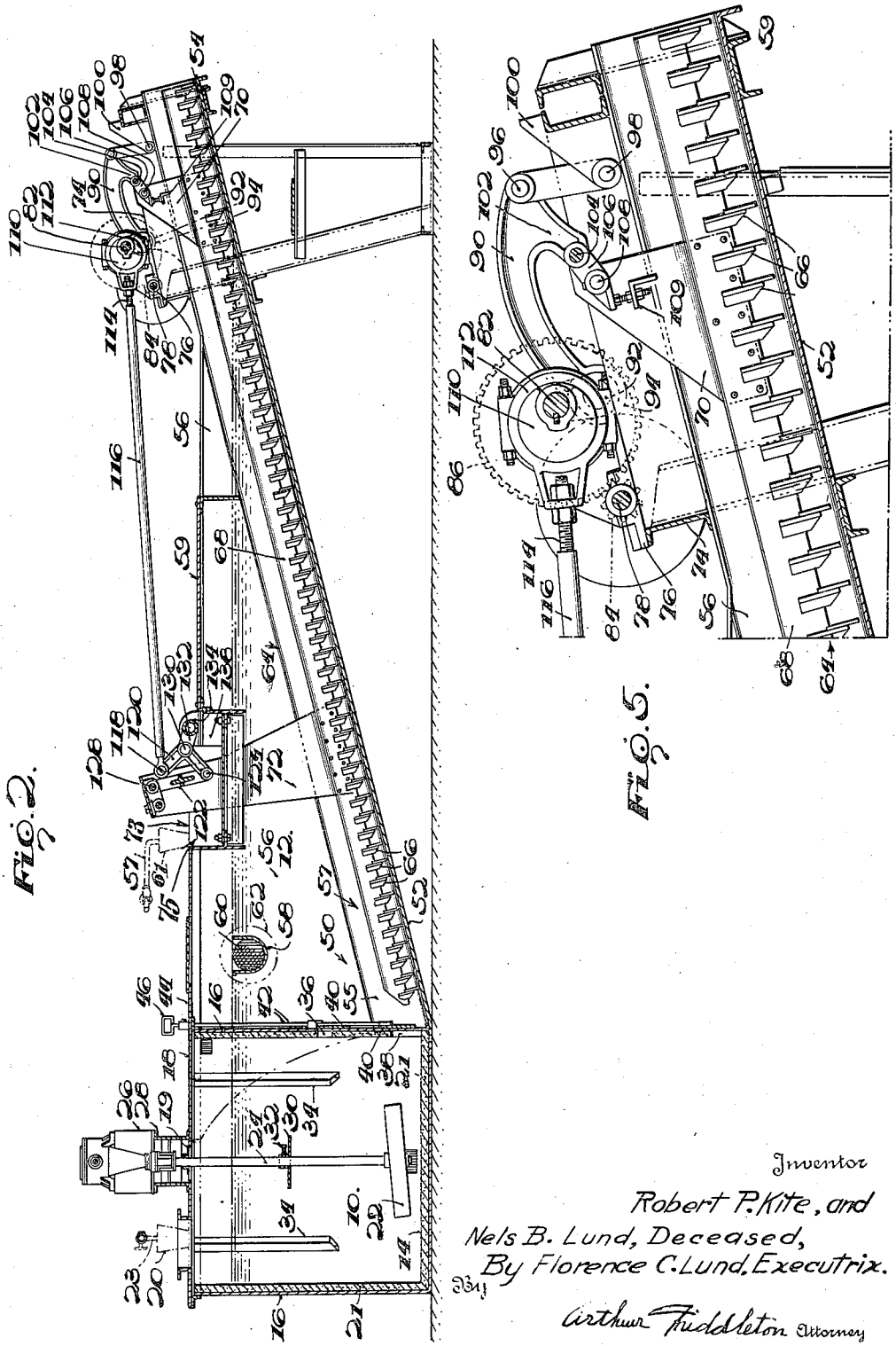

UNITED STATES PATENT OFFICE 2,261,390

LIME SLAKER

Robert P. Kite, Larchmont, N. Y., and Nels B. Lund, deceased, late of Seaford, Long Island, N. Y., by Florence C. Lund, executrix, Seaford, Long Island, N. Y., assignors to The Dorr Company, Inc., New York, N. Y., a corporation of Delaware Application April 24, 1940, Serial No. 331,483

8 Claims. (Cl. 23—287)

The improved slaking and degritting apparatus comprising the present invention is primarily adapted for use in preparing milk of lime from quick lime and simultaneously hydraulically separating the insoluble residue therefrom, although the principles of the invention are applicable to other uses and the slaking and degritting apparatus may, with or without modification, be employed in the production of milk of magnesia and other products of a similar nature from oxides capable of being slaked with water to produce a more or less chemically pure suspension of an hydroxide in an aqueous solution of the hydroxide, i. e., a suspension of an hydroxide in less water than is required for complete solution.

Slaked or hydrated lime, chemically known as calcium hydroxide, is ordinarily produced by the admixture of suitable quantities of water to quick lime or calcium oxide, the actual reaction being accompanied by a rapid evolution of heat and consequent ebullition and generation of steam.

Various processes and apparatus have been proposed for the hydration of lime, most of which comprise as an essential part thereof an hydrating chamber in which water is added to the oxide and intimately mixed therein. In many instances no attempt is made to remove the insoluble residue such as grit or detritus that may have become entrained in the suspension and, where such an attempt is made, the process is invariably carried out in an apparatus that is independent of the hydrating chamber. Furthermore, most apparatus of this character is designed to remove merely coarse gravel and cores from the hydroxide suspension.

While slaking and degritting apparatus of this character may produce fairly satisfactory results, it is usually heavy and cumbersome, besides being costly. Because of space limitations and because the apparatus is comprised of independent units each performing its individual function, difficulty is encountered in assigning the most desirable location to the apparatus. In addition to this, the sub-structures for supporting the apparatus has been costly and has materially increased the installation costs.

The present invention is designed to overcome the above noted limitations that are attendant upon the construction, installation and use of present day lime slaking and degritting apparatus and toward this end it contemplates the provision of a combined, unitary lime slaking and degritting apparatus having a lime slaking zone and an adjacent degritting zone in communication therewith, the arrangement being a compact one whereby there is a conservation of floor space and head-room, and the assembly being comparatively light whereby less supporting sub-structure is required for its installation.

This being the principal object of the invention, it is another object thereof to provide an apparatus of this character whereby a continuous process may be carried out as distinguished from the usual batch process, and whereby the degritted hydrated lime may be uniformly and continuously flowed from the apparatus in one path and the coarse gravel, the finer grit or sand, and the other insoluble impurities continuously removed in another path.

In carrying out the above mentioned object, the invention contemplates the provision of an apparatus having a section or zone characterized by agitation in order to stimulate the reaction of the water and the oxide during the slaking operation, and an adjacent and communicating section characterized by relative quiescence wherein stratification or sedimentation may take place in order that the entrained and suspended particles of grit and other impurities may settle to form sediment at the bottom of the quiescent zone, together with means for mechanically removing the settled sediment from the quiescent zone substantially at the rate of its deposition without materially agitating or disturbing the quiescence of the liquid in the latter zone.

Another object of the invention is to provide an apparatus of this character having a slaking zone and a quiescent zone in which means is provided for preventing the normal agitative effects of the mechanical agitating means and the more 'violent agitative effects of the ebullition which is characteristic of all slaking operations of this character, from being transmitted to the quiescent zone and interfering with sedimentation.

It is another object of the invention to provide such an apparatus wherein the liquid content of the slaking zone may be maintained at a greater density than the liquid content of the quiescent zone and wherein there is provided a controlled communication between the two zones to permit the relative densities of the two zones to be altered at will.

In carrying out this last mentioned object, the invention contemplates a controlled communication between the two zones by means of which the rate and manner of the flow of the hydrated oxide from the slaking zone to the quiescent degritting zone may be regulably predetermined.

Another object of the invention is to provide such an apparatus in which the quiescent settling zone is provided with walls of such shape and contour that the zone has the maximum settling capacity for the specific volume of liquid it contains and in which the sediment or grit removal means, although having a relatively large sediment removing capacity to accommodate the high rate of settling, occupies a minimum of space and presents little hinderance to the settling solids throughout the zone.

This object is accomplished by forming the side walls of the quiescent settling zone at an incline which is steeper than the angle of repose of the settling solids and in creating therebetween a trough-like grit removal section and in which the mechanical grit removal instrumentalities operate. It is proposed to utilize as the grit or sediment removal means a raking mechanism of the type disclosed in the patent to Finney, 1,997,379, in which movements are imparted to the rake at two motivating points by a link system driven by eccentric or crank mechanisms, the rake being continually suspended from the controlling link system and being given a predetermined cyclic movement consisting of a rectilinear feed stroke and an elevated return stroke. Because of the fact that the raking mechanism is comparatively narrow and operates entirely within the central trough-like section, little hinderance by agitation is offered to the outlying regions in the vicinity of the sloping side walls of the zone and thus the effective sedimentation that takes place in the restricted trough-like grit removal section is a function not of the width of this section alone, but of the surface area of the entire quiescent settling zone. In other words, sedimentation will take place throughout the entire zone including the narrow trough-like grit removal section and the outlying regions on either side thereof. However, since the inclination of the side walls of the zone is steeper than the angle of repose of the solid settled particles, these particles will be directed inwardly to the central grit removal section and the apparent rate of settling in this latter section will be materially increased. By such an arrangement, the capacity of the raking mechanism is materially increased and the proportion of solid particles removed thereby is relatively large despite the reduced width of the rake members. In addition to this not only is the weight of the raking mechanism materially reduced thus requiring less power and a smaller motor to operate the same, but the overall weight of the entire apparatus is reduced, thus contributing to the attainment of the other above mentioned advantages of the invention such as the use of a small sub-structure etc. as previously set forth.

Other objects and advantages of the invention, not at this time enumerated, will become apparent as the nature of the invention is better understood.

In the accompanying drawings, forming a part of this specification, one illustrative embodiment of the invention is shown. In these drawings:

Figure 1 is a plan view of a preferred embodiment of the invention.

Figure 2 is a side elevational view thereof, the wall structure being shown in section to more clearly illustrate the invention, and Figure 3 is a sectional view taken substantially along the line 3—3 of Figure 1.

Figure 4 is an enlarged fragmentary longitudinal sectional view of a medial portion of the apparatus, and Figure 5 is an enlarged fragmentary longitudinal sectional view taken through the upper right-hand end of the apparatus as viewed in Figure 2.

In all of the above described views, like characters of reference are employed to designate like parts throughout.

Referring now specifically to the drawings, the apparatus involves in its general organization a tank section 10 providing a slaking zone or chamber and a classifier section 12 providing a settling and degritting zone, the two zones communicating with each other in a manner and for a purpose that will appear hereinafter.

The tank section 10 is preferably cylindrical in its design and includes a bottom 14, a cylindrical side wall 16 and a top wall or cover plate 18 provided with a vent opening 19. The bottom 14 and side wall 16 are preferably lined with concrete or other chemically resistant material as indicated at 21. The quick lime or other oxides to be slaked are introduced into the tank section 10 through a feed chute 20 together with stoichiometrical proportions of water for the slaking reaction, the latter being introduced by means of a water supply pipe 23, the proportions of the oxide and water being varied according to the grade of the oxide employed, the percentage of impurities contained therein, the degree of burning to which it was subjected in its manufacture, etc.

In order to effectively agitate the contents of the slaking chamber 10, an impeller agitator 22 is carried at the lower end of an operating shaft 24 which extends downwardly through the cover plate 18 to a point adjacent the bottom of the slaking chamber 10. The operating shaft 24 is driven from a suitable motor M (Figure 1) through a gear reduction device or drive unit 26, these latter elements being mounted on a superstructure 28 at the top of the chamber 10 and including suitable means such as bevel gears (not shown) whereby the vertical operating shaft 24 and horizontal motor shaft and drive connections are operatively coupled.

In slaking apparatus of this type utilizing a vertical impeller shaft, it has been found that due to the creation of a vortex in the swirling mass of liquid in the slaking zone, air is drawn downwardly in this zone below the normal liquid level of the tank, thus creating a temporary void, the bottom of which occupies a position near the bottom of the tank. Some of the lime introduced into the tank finds its way directly into the void while other portions thereof are drawn into the vortex by the action of the impeller and thus a violent reaction between the lime and hot liquid in the tank takes place near the bottom of the tank with a result that gushes of steam and air are sent outwardly from the bottom of the tank in all directions. In applicants' present form of apparatus such gushes of steam or air if allowed to occur would ordinarily extend into the settling zone and violently agitate the contents thereof thus making sedimentation well nigh impossible and possibly causing splashing of the hydroxide liquid over the side walls of the apparatus.

In order to prevent the creation of a vortex in the mass of liquid undergoing agitation in the slaking zone, or at least in order to reduce such a vortex to a minimum, a baffle plate or disk 30 is adjustably mounted as at 32 on the impeller shaft 24 and is positioned well below the normal level of liquid in the tank 10. Additionally, a series of circularly arranged stationary baffles 34 extend downwardly into the tank 10 below the normal liquid level thereof and are supported from the cover plate 18. The disk 30 serves directly to break up any vortex that might tend to form in the slaking zone while the baffles 34 retard the swirling mass of liquid and further reduce any tendency for the vortex to form. In this manner the lime that enters the slaking zone from the feed chute 20 reacts initially with the hot liquid hydroxide in the tank 10 near the top of the body of liquid and any steam created may readily escape through the vent opening 19.

Referring now to Figure 2, the slaking zone 10 communicates with the quiescent settling and degritting zone 12 through a series of upper and lower flow openings 36 and 38, respectively, provided in the wall 16 preferably adjacent the medial longitudinal vertical plane of the apparatus. While any number of the openings 36, 38 may be utilized, for illustrative purposes there has been disclosed an upper opening 36 and a lower opening 38. The lower opening 38 terminates flush with the effective bottom wall of the tank 10 in order to present a free unobstructed path for the larger or heavier particles or lumps of material passing with the hydroxide solution from the slaking zone 10 to the settling and degritting zone 12. The upper opening 36 will permit egress of the lighter particles with the solution and occasional heavier particles from the slaking zone 10.

The size of the openings 36 and 38 may be varied by means of vertically slidable gate members 40 which are mounted upon vertically extending operating rods 42 that project upwardly through an extension 44 formed on the cover plate 18 and are provided with operating handles 46. It is to be noted that the gate members 40 are movable to various positions in which they decrease the effective height of the various openings 38 without interfering with passage of the heavier particles of material through these openings by a rolling or sliding movement on the bottom of the slaking chamber 10. Compared to the total volume of liquid normally present in the apparatus, the openings 36 and 38 are relatively small and as a consequence, despite the violent turbulence that may exist in the slaking zone 10, an inconsequential degree of such turbulence will be carried over into the settling and degritting zone. Furthermore, because of the fact that the size of the openings 36 and 38 may be adjustably regulated, any agitation of the liquid contained in the settling and degritting zone 12 that may occur during actual operation of the apparatus may effectively be reduced to a minimum by decreasing the size of these flow openings until such agitation has ceased. In addition to this, the openings 36 and 38 provide a controlled communication between the slaking zone and the degritting zone by means of which the normally greater density of the liquid content of the former zone may be substantially isolated from the latter zone while at the same time permitting a predetermined flow of the dense liquid into the less dense liquid at a predetermined rate that may be calculated according to various engineering exigencies.

Still referring to Figure 2 and in addition to Figure 3, the classifier section comprising the settling and degritting zone 12 includes a classifier tank or rake trough section 50 having a relatively narrow sloping bottom or deck 52 extending from a point or region immediately below the lower gate or flow openings 38 formed in the cylindrical wall 16 of the tank 10, upwardly and outwardly and terminating in an overflow lip 54 for the solid sedimentary materials. The tank 50 is generally of tapered design extending outwardly and upwardly from the lower regions of the tank 10 and embraces an adjacent portion of the side wall 16 of the tank 10. A pair of side walls 55 extending upwardly from the bottom 52 provide a longitudinal trough-like medial grit removal section designated generally at 57 in which all of the sedimentary matter that settles out in the settling zone is ultimately received. The side walls 55 are provided with coextensive outwardly inclined extensions or walls 56 which are best illustrated in Figure 3, these walls extending upwardly above the level of liquid in the apparatus. The extension 44 of the cover 18 provides a cover for the lower regions of the classifier section as well as for the medial regions thereof. Since the cover plate 18, 44 extends continuously over both the slaking and degritting zones, the liquid in the slaking mechanism as a whole is effectively confined and the outside of the apparatus is thus maintained in a clean condition. An auxiliary water supply pipe 57 may be employed for supplying water to a water feed funnel 61 for introduction to the classifier section through the cover plate extension 44. In this manner the density of the liquid content of the material in the classifier section may be maintained lower than that of the slaking section.

An overflow weir or launder 58 which is generally of U-shape cross section extends across the side wall extensions 56 and communicates with a pair of openings 60 provided in the latter on each side of the apparatus. Either or both of the openings 60 are adapted to communicate with an overflow pipe 62. The overflow launder is adapted to receive therein the substantially grit-free suspension of hydroxide in the hydroxide solution. The level of the launder obviously determines the normal liquid level of the degritting zone and also of the slaking zone.

The inclination of the side wall extensions 56 is steeper than the angle of repose of solid particles resting thereon within the liquid hydroxide solution. In other words, solid particles of sedimentary matter such as grit and the like tending to settle upon the inclined walls 56 will not find stable equilibrium thereupon and consequently they will progress by gravity inwardly of the structure toward the trough-like grit removal section and settle upon the bottom 52 thereof and be removed by the raking mechanism which will subsequently be described.

Because of the sloping side wall extensions 56 and the medial trough-like grit removal section, it will be seen that there will be a tendency for the sedimentary material to become concentrated in the trough-like section due to the fact that settling may take place unhindered in practically all regions of the settling zone whereas ultimate repose of the particles will occur solely in the trough-like medial section. In this manner maximum settling capacity for the specific volume of liquid contained in the settling and degritting zone is attained. Furthermore, since the entire amount of sedimentation occurring throughout the settling zone is ultimately concentrated in the trough-like section 57, maximum efficiency of the raking mechanism which operates in this section is attained. Additionally, the fact that the lower openings 38 leading from the cylindrical tank 10 communicate directly with the trough-like section 57, causes a considerable portion of the solids, especially the heavier particles, to be deposited initially in the path of the raking mechanism, thus further increasing the efficiency thereof.

It is pointed out that the minimum slope or steepness of the side wall extensions 56 may be determined according to the materials being operated upon and depends mainly upon the critical angle of repose of the solids settling out in the liquid hydroxide. However, if too steep a slope is employed, either the overall settling area will be decreased or the width of the medial trough-like grit removal section will have to be increased, either of these factors operating adversely to optimum settling efficiency for the specific volume of liquid present. In the former instance, since sedimentation occurs in any settling apparatus in direct proportion to the surface area, a reduction of such surface area effects a corresponding reduction in the rate of sedimentation for the given body of liquid. In the latter instance, since the width of the trough-like section is increased, the width of the grit removal raking mechanism must be correspondingly increased and in such an instance an increase in the relatively slight agitative effect ordinarily produced by this mechanism is also increased. In addition to this, such an increase in the width of the trough-like section is had at the expense of the outlying relatively quiescent regions on each side thereof which are decreased, thus further reducing the settling rate for the given body of liquid.

Referring now to Figures 2, 4 and 5, the grit removal instrumentalities include a rake structure 64 including transverse rake plates 66 mounted on longitudinally extending beams 68 suspended from a hanger plate 70 adjacent the upper end of the classifier section 12 and a similar plate 72 adjacent the lower end thereof, the latter passing upwardly through a slot 73 in the cover extension 44. A well 75 surrounds the hanger plate 72 adjacent its upper end and serves to return any liquid that may escape through the slot 73 to the tank. A framework 74 supported from the side walls of the classifier structure has mounted thereon a pair of aligned bearings 76 in which there is rotatively mounted a pulley shaft 78, and a similar pair of bearings 80 in which there is mounted a drive shaft 82. A pinion 84 on the pulley shaft 78 serves to drive the shaft 82 through a spur gear 86 housed within a casing 88. The pulley shaft 78 is adapted to be driven in any suitable manner, as for example by means of a pulley or by an electric motor which may be operatively connected to the pulley shaft by any suitable driving means.

A drive bar or link 90 is pivoted at its free end to a pin 92 carried at the outer end of a crank 94 mounted on the shaft 82. The other end of the link 90 is connected by a link shaft 96 to a stationary bracket 100. A short downward extension 102 of the drive link 90 carries a pivot pin 104 passing through adjusting links 106 having an adjustable connection as at 108 with the hanger plates 70. Adjusting screws 109 bearing against the links 106 permit the distance between the upper rake blades 66 and the bottom 52 of the trough-like section to be adjusted.

The arrangement for imparting the desired cyclic vertical movement to the lower part of the rake structure 64 includes broadly means for causing the lower suspension point to travel in an arcuate path, and means for superimposing harmonic vertical movement on the travel of said point along the path, the arcuate and the harmonic vertical movements being synchronized so that the lower half of the harmonic motion will be simultaneous with movement along the entire length of the arcuate path in the advance or feed stroke direction, while the upper half of the harmonic movement will be simultaneous with movement along the arcuate path in the return direction.

Vertical movement is imparted to the lower portion of the rake structure by means of an eccentric 110 mounted on the drive shaft 82. The eccentric 110 is connected to the rake structure through an eccentric strap 112 having an adjustable threaded connection 114 at one end thereof with a reach rod 116, the other end of the reach rod being pivotally connected as at 118 to one end of a bell crank lever 120, the other end thereof being designed to impart suitable vertical harmonic movement to the rake structure. The arcuate movement is produced through a pair of rocker arms or links 122 pivoted as at 124 at their lower ends to the bell crank lever 120 and at their upper ends as at 128 to the hanger plate 72.

In order to raise and lower the lower regions of the rake structure 64, the fixed pivot 130 is carried at the outer end of a lifting arm 132 mounted on a transverse shaft 134 carried in bearings 136 supported on a cross beam 138, a worm gear and hand wheel assembly 140 being utilized for tilting the lifting arm 132.

The construction and arrangement of the above described driving mechanism for the rake structure is similar in many respects to the driving mechanism shown in the above mentioned patent to Finney and reference may be had thereto for a full disclosure of the operation thereof, it being sufficient herein to state that in the arrangement of this mechanism substantially the same relationships as are set forth in the Finney patent should be observed. Thus for synchronous operation, the eccentric 110 should be set on the shaft 82 rearwardly of the crank arm 94 and at 90° thereto plus or minus a small determinate angle as set forth in the said patent. Likewise, the angle between the arms of the bell crank lever 120; the length of the reach rod 116; the respective lengths of the arms of the bell crank lever 120; the throw of the eccentric 110; the length of the link 122; and other relationships in the present apparatus remain substantially the same as in the structure disclosed in the Finney patent for most efficient operation of the rake structure.

The arrangement of the above described driving connections for the rake structure is more or less conventional insofar as the present application is concerned and no claim is made herein to any novelty associated therewith, the novelty residing rather in the combination of a settling zone and a degritting zone arranged in contiguity with means for regulably controlling the flow of materials from one zone to the other; in the means for preventing mechanical agitation and physical ebullition in the former zone from affecting settling in the latter zone; in the shape of the classifier section whereby a maximum settling rate for the given quantity of liquid is attained; and in the other features of the invention herein set forth in detail.

The invention is not to be limited to the exact arrangement of parts shown in the accompanying drawings or described in this specification as various changes in the details of construction may be resorted to without departing from the spirit of the invention. Only insofar as the invention has particularly been pointed out is the same to be limited.

What is claimed is:

1. In a slaking apparatus of the character described, a tank having a cylindrical side wall, a bottom and a cover plate provided with a vent opening, a vertical impeller shaft extending downwardly into said tank and terminating adjacent the bottom thereof, an impeller on the lower end of the shaft, a baffle plate secured to the shaft medially thereof and below the normal level of liquid in the tank, a series of annularly disposed stationary baffles secured to the cover plate and extending downwardly into the tank below the normal liquid level thereof, and means for rotating the impeller shaft.

2. In a slaking apparatus of the character described, a tank having a cylindrical side wall, a bottom and a cover plate provided with a vent opening, a vertical impeller shaft extending downwardly into said tank and terminating adjacent the bottom thereof, an impeller on the lower end of the shaft, a baffle plate secured to the shaft medially thereof and below the normal level of liquid in the tank, means for securing said baffle plate to the shaft in any desired position of vertical adjustment, a series of annularly disposed stationary baffles secured to the cover plate and extending downwardly into the tank below the normal liquid level thereof, and means for rotating the impeller shaft.

3. In a slaking apparatus, a tank having a cylindrical side wall and providing a slaking zone, a second tank adjacent the cylindrical tank and embracing a portion of the side wall and providing a quiescent zone, there being a relatively small lower opening extending through the embraced portion of the side wall adjacent the bottom thereof and terminating flush with the bottom of the cylindrical tank, an upper opening in said embraced portion above the level of the lower opening, means for varying the size of said lower opening while still maintaining the same flush with the bottom of the cylindrical tank, said openings equalizing the normal liquid level of the tanks, an overflow weir leading from the second tank and determining the common liquid level of the two tanks, and means for agitating hydroxide suspension-forming materials in the cylindrical tank.

4. In a slaking and degritting apparatus, a tank having a cylindrical side wall and providing a slaking zone, a second tank adjacent the cylindrical tank and embracing a portion of the side wall and providing a quiescent settling zone, there being a relatively small lower opening extending through the embraced portion of the side wall adjacent the bottom thereof and terminating flush with the bottom of the cylindrical tank, an upper opening in said embraced portion above the level of the lower opening, means for varying the size of said lower opening while still maintaining the same flush with the bottom of the cylindrical tank, said openings equalizing the normal liquid level of the tanks, an overflow weir leading from the second tank and determining the common liquid level of the two tanks, means for agitating hydroxide suspension-forming materials in the cylindrical tank, a raking mechanism for continuously removing sedimentary materials from the second tank, and means for actuating the raking mechanism.

5. In a slaking and degritting apparatus, a tank having a cylindrical side wall and providing a slaking zone, a second tank adjacent the cylindrical tank and embracing a portion of the side wall and providing a quiescent settling and degritting zone, said latter tank having a relatively narrow elongated sloping deck and a pair of oppositely inclined side walls coextensive at least in part with said deck, the angles of inclination of said side walls being slightly greater than the normal angle of repose of solid particles maintained in a liquid suspension in said tank, a raking mechanism cooperating with said sloping deck for removing settled solids therefrom, there being a relatively small opening extending through the embraced portion of said cylindrical side wall adjacent the bottom of the cylindrical tank whereby the two tanks are in communication and the normal liquid level thereof is equalized, an overflow weir leading from the second tank and determining the common liquid level of the two tanks, and means for agitating hydroxide suspension-forming materials in the cylindrical tank.

6. In a slaking and degritting apparatus, a tank having a cylindrical side wall and providing a slaking zone, a second tank adjacent the cylindrical tank and embracing a portion of the side wall and providing a quiescent settling and degritting zone, said latter tank having a relatively narrow elongated sloping deck and a pair of oppositely inclined side walls coextensive at least in part with said deck, the angles of inclination of said side walls being slightly greater than the normal angle of repose of solid particles maintained in a liquid suspension in said tank, a raking mechanism including transverse rakes of a length substantially equal to the width of said sloping deck cooperating with said sloping deck for removing settled solids therefrom, there being a relatively small opening extending through the embraced portion of said cylindrical side wall adjacent the bottom of the cylindrical tank whereby the two tanks are in communication and the normal liquid level thereof is equalized, an overflow weir leading from the second tank and determining the common liquid level of the two tanks, said means for agitating hydroxide suspension-forming materials in the cylindrical tank.

7. In a slaking and degritting apparatus, a tank having a cylindrical side wall and providing a slaking zone, a second tank adjacent the cylindrical tank and embracing a portion of the side wall and providing a quiescent settling and degritting zone, said latter tank having a relatively narrow elongated sloping deck and vertical side walls providing a central trough-like sediment removal section, a pair of oppositely inclined walls forming extensions of said side walls and coextensive at least in part therewith, the inclinations of said inclined walls being slightly greater than the angle of repose of solid particles maintained in a liquid suspension in said latter tank, a raking mechanism operating in said trough-like section for removing settled solids therefrom, there being a relatively small opening extending through the embraced portion of said cylindrical side wall adjacent the bottom of the cylindrical tank whereby the two tanks are in communication and the normal liquid level thereof is equalized, an overflow weir leading from the second tank and determining the common liquid level of the two tanks, and means for agitating hydroxide suspension-forming materials in the cylindrical tank.

8. In a slaking and degritting apparatus, a substantially closed cylindrical tank having a vertical cylindrical side wall and providing a turbulent slaking zone, a second tank adjacent the cylindrical tank and embracing a portion of the side wall and providing a quiescent settling zone, said tanks each being provided with a flat bottom wall, the bottom wall of the slaking zone being substantially horizontal and the bottom wall of the settling zone forming a substantial continuation of the bottom wall of the slaking zone and extending uniformly outwardly and upwardly in an incline plane from a region adjacent said embraced portion of the cylindrical wall and entirely externally thereof, the lower end of the inclined bottom wall of the settling zone being disposed at an elevation at least as low as the elevation of the horizontal bottom wall of which it is a continuation, there being a relatively small opening extending through said embraced portion of the cylindrical side wall adjacent the bottom of the latter whereby the two zones are in communication and the normal liquid level thereof is equalized, an overflow weir leading from the second tank and determining the common liquid level of the two tanks, means for producing vigorous agitation of the liquid contents of the cylindrical tank, the size of said opening being sufficiently small that turbulence developed in the slaking zone is incapable of being imparted to any material degree to the quiescent zone, a raking mechanism for continuously removing sedimentary materials from the second tank, and means for actuating the raking mechanism.

ROBERT P. KITE.
FLORENCE C. LUND,
*Executrix of the Estate of Nels B. Lund, Deceased.*